United States Patent
Hetrich

[15] 3,692,889
[45] Sept. 19, 1972

[54] METHOD AND APPARATUS FOR FORMING CORRUGATED PLASTIC TUBING

[72] Inventor: Arthur Ronald Hetrich, Manheim, Pa.

[73] Assignee: Raybestos-Manhattan, Inc., Manheim, Pa.

[22] Filed: March 17, 1970

[21] Appl. No.: 20,174

Related U.S. Application Data

[63] Continuation-in-part of Ser. No. 749,736, Aug. 2, 1968, abandoned.

[52] U.S. Cl. ............... 264/92, 18/14 RR, 18/19 TC, 264/99, 264/167, 264/209, 264/290 R
[51] Int. Cl. .......................... B29c 17/07, B29d 23/18
[58] Field of Search........ 264/89, 90, 92, 95, 99, 127, 264/167, 209, 230, 280, 290 R; 18/14 A, 14 RR, 19 TC

[56] References Cited

UNITED STATES PATENTS

| | | | |
|---|---|---|---|
| 3,306,962 | 2/1967 | Pepper | 18/14 A X |
| 3,283,050 | 11/1966 | Boggs | 18/14 A X |
| 2,423,260 | 7/1947 | Slaughter | 18/14 A X |
| 3,529,047 | 9/1970 | Yoshida et al. | 264/90 X |
| 3,296,661 | 1/1967 | De Moustier | 18/14 A |
| 3,086,242 | 4/1963 | Cook et al. | 18/14 A X |

Primary Examiner—Robert F. White
Assistant Examiner—J. H. Silbaugh
Attorney—Howson and Howson

[57] ABSTRACT

Corrugated plastic tubing is formed by producing a plastic tube in a softened condition, passing the softened tube through a rotatable disc having an axial bore with a helical groove for corrugating the wall of the tubular body and then cooling the tube to set the corrugations formed in the wall of the tube. Means is provided for rotating the die, and means synchronized with the rotating means is also provided for drawing the tubular body through the die and cooling chamber to form a helical corrugation in the tubing wall. A pressure differential is applied in the die across the wall of the tubular body to force the wall of the tube into the die groove. Means is provided for engaging the softened tubular body adjacent the entrance to the die to restrain the tubular body against rotation with the die and prevent the softened tubular body from becoming twisted or kinked before entering the die.

2 Claims, 6 Drawing Figures

INVENTOR:
ARTHUR RONALD HETRICH
BY
Howson & Howson
ATTYS.

PATENTED SEP 19 1972 3,692,889

INVENTOR:
ARTHUR RONALD HETRICH
BY
Howson & Howson
ATTYS

INVENTOR:
ARTHUR RONALD HETRICH

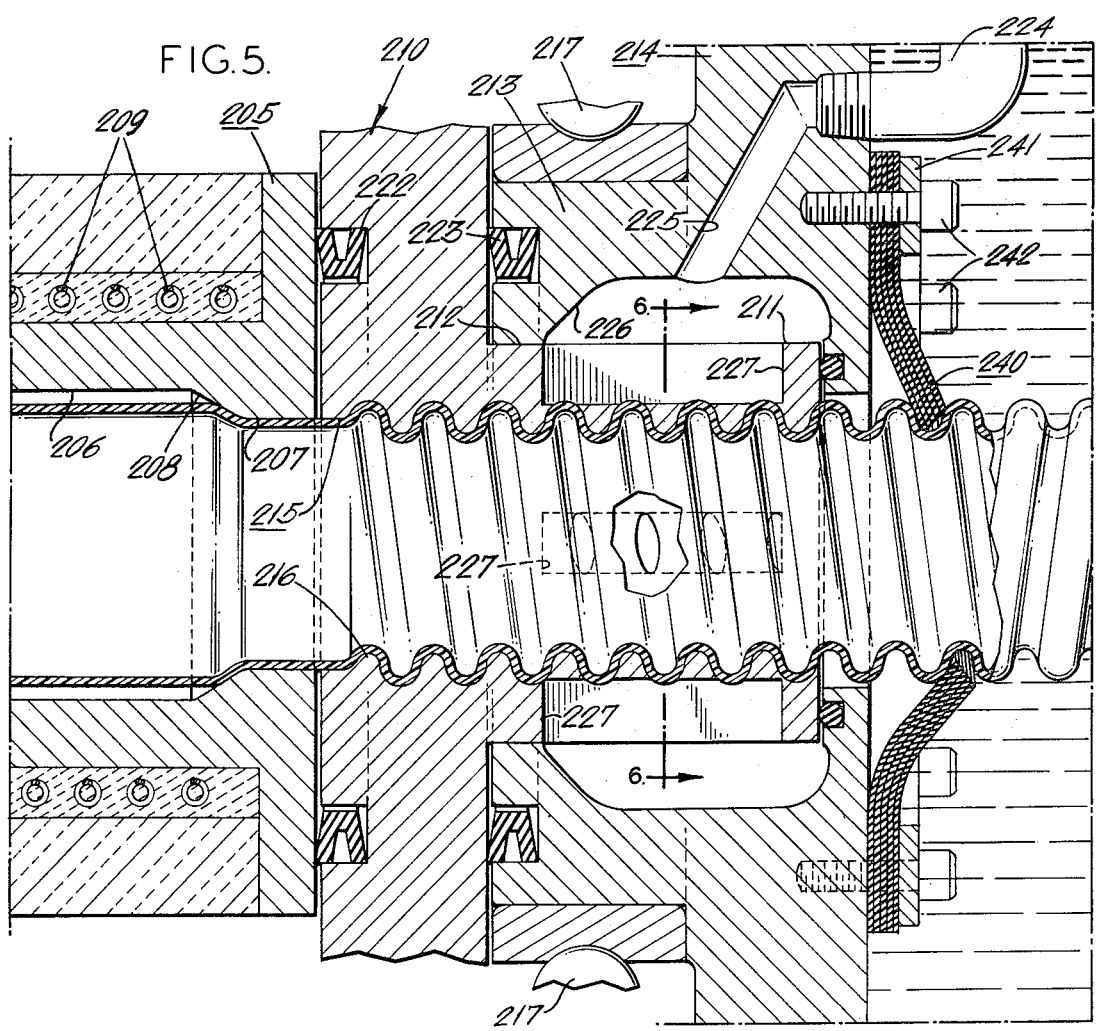
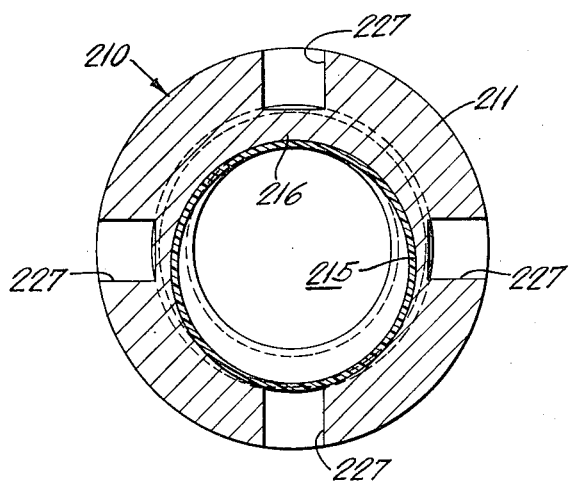

METHOD AND APPARATUS FOR FORMING CORRUGATED PLASTIC TUBING

This application is a continuation-in-part of my earlier-filed copending application, Ser. No. 749,736, filed Aug. 2, 1968, now abandoned.

The present invention relates to a method and apparatus for forming corrugated plastic tubing, and more particularly, the present invention relates to a method and apparatus for forming corrugated plastic tubing having a helical corrugation in the tube wall.

The increased use of plastic tubing in various applications in recent years has generated demands for techniques and machinery to continuously produce large quantities of tubing at relatively low costs. In some applications, for instance in conduits in aircraft electrical systems, it is desirable for the tubing to be sufficiently flexible to permit it to be bent into tortuous configurations. In addition, the operation of aircraft at high altitudes and under various G-loading conditions requires that the tubing not only possess good dielectric strength, but also that it possess good mechanical strength by having a minimum of internal stresses within the conduit, as would be present in the vicinity of a seam, for example. Tubing formed of fluorinated ethylene, propylene polymers possesses good dielectric strength; however, heretofore apparatus has not been available for forming continuous, seamless lengths of corrugated tubing from such polymers.

For example, there are a number of known processes and apparatus in the prior art for forming corrugated plastic tubing; however, each has certain disadvantages. There is apparatus in which separate die segments are used for molding the wall of a plastic tube. Such apparatus does not produce a seamless tube and is generally limited to forming relatively short lengths of tubing. Although apparatus is available whereby continuous lengths of corrugated tubing may be formed using separate die segments which mold the tubing wall while moving axially along with the tubing; nevertheless, this apparatus is complex and expensive. Similar disadvantages are inherent in conventional blow-molding machinery, and, in addition, conventional blow-molding machinery is not adapted to produce continuous lengths of corrugated tubing. Furthermore, each of the aforementioned tube-forming devices is not readily adapted to be quickly changed to produce tubing of different sizes and characteristics, and skilled operators are required to effect the desired changes.

With the foregoing in mind, it is a primary object of the present invention to provide an improved method and apparatus for continuously forming seamless, helically corrugated, plastic tubing.

It is another object of the present invention to provide novel tube-forming apparatus which is compact and capable of producing seamless corrugated tubing in a continuous process.

As a further object, the present invention provides tube-forming apparatus which is unique and particularly adapted to produce corrugated tubing in which the sizes and characteristics of the tubing may be changed quickly and with a minimum amount of tools and skill.

More particularly, apparatus of the present invention comprises means for producing a plastic tube in a softened condition, a die for receiving the softened tube having a helically grooved axial bore mounted for rotation about its axis, and means for cooling the tube to set the helical groove in the wall thereof. Means is provided for rotating the die, and means is mounted at the entrance of the die for frictionally engaging the exterior surface of the tubing wall to prevent the tubing from rotating with the die so that the softened tubing will not be twisted or kinked before entering the rotating die. The softened tubular body is drawn axially through the die by means synchronized with the die rotating means, and means is provided for producing a pressure differential in the die across the wall of the tubing to urge the tube wall into the groove to thereby form a helical corrugation in the wall.

In addition to the foregoing, other objects, features and advantages will become apparent from the following description taken in conjunction with the accompanying drawings, in which:

FIG. 5 is an enlarged fragmentary view in longitudinal section of the die area of the apparatus shown in FIG. 4; and FIG. 6 is a sectional view taken on line 6—6, FIG. 5.

According to the conventional tube-forming practice, a plastic tube is produced in a softened condition, and the softened tube then is set or quenched by passing it through a cooling medium. When it is desired to impart a helical configuration to the wall of the tubing, it has often been necessary to process the tubing in a separate step with appropriate forming apparatus. Thus, this conventional process is undesirable not only because it is relatively slow, but also because additional handling of the tubing is required. Accordingly, the method of the present invention obviates these disadvantages by producing seamless, helically corrugated plastic tubing in a continuous process. To this end, the steps employed in practicing the method of the present invention comprise: producing a plastic tube in a softened condition; introducing the softened tube into a die having a bore with a helical groove therein, applying a pressure differential across the wall of the tube in the die while rotating the die relative to the tube to urge the wall of said tube into the helical groove of the die to form a helical corrugation in the tube wall, frictionally engaging the softened tube before entering the die to prevent rotation of the tube with said die, cooling the tube as it progresses through the die to set the helical corrugations in the tube, and removing the tube from the die.

Preferably, the tube is drawn through the die at a linear rate corresponding to the formula: $V = W/N$, where $V$ is the linear velocity of the tube in feet/minute, $W$ is the angular velocity of the rotating tube die in revolutions/minute, and $N$ is the number of helical groove revolutions per linear foot measured axially in the die. Ordinarily the die will be rotated from about 60 to 120 revolutions/min., and the pitch of the die will be from 36 to 96 helical groove revolutions per foot.

The method of the present invention is particularly advantageous for forming plastic tubing wherein the plastic is a thermoplastic fluorocarbon, such as a copolymer of fluorinated ethylene and fluorinated propylene (FEP), tetrafluoroethylene (TFE), and the like. In the case of FEP, the material is softened by heating in the tube-producing step and extruded at about 650° F. and is cooled in the cooling step to about 60° F. On the other hand, in the case of TFE, the material is not extruded but a pre-formed tube of TFE is softened by heating to about 680° F., passed through the die, and then cooled to about 60° F. In each case a pressure differential across the tube wall in the die of about 5 pounds per square inch should be maintained to obtain optimum results.

Figure 1:
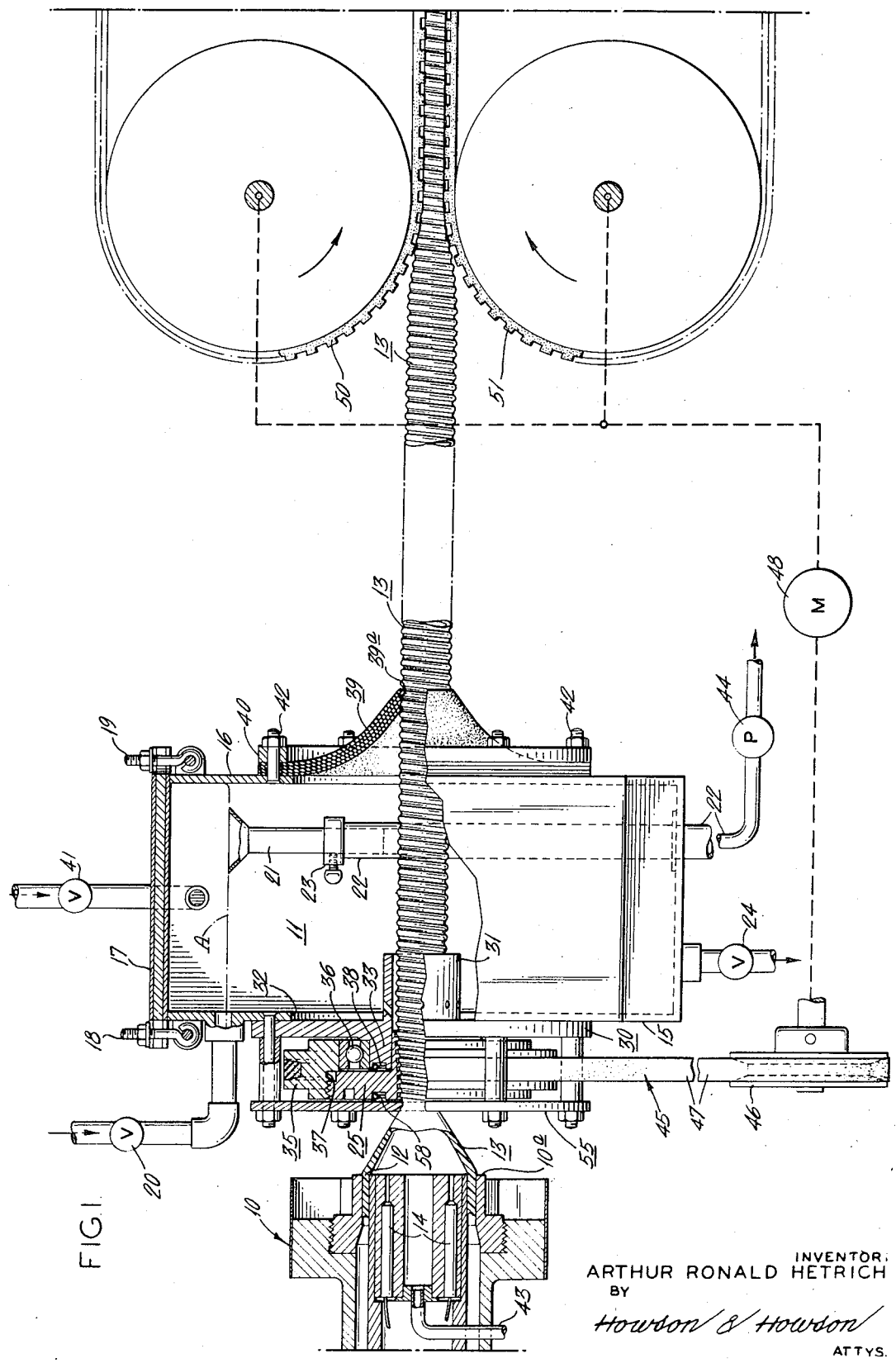
FIG. 1 is a side elevational view of one embodiment of tube-forming apparatus embodying the present invention, with portions broken away.

For the purpose of practicing the foregoing method, and in accordance with the primary object of the present invention, apparatus is provided for making continuous lengths of helically corrugated plastic tubing. Referring now to the drawings, FIG. 1 illustrates one embodiment of a tube-forming apparatus comprising an extruder 10 which may be any conventional extruder for thermoplastic material, and a cooling or quenching chamber shown generally at 11. The extruder 10 has a discharge end 10a in which is provided an annular orifice 12 through which an extrudate 13 is expressed. A plurality of cartridge-type electrical heaters 14,14 are mounted in the extruder 10 adjacent the discharge end 10a to heat the extrudate 13 into a softened flowable condition. If desired, other heaters of the band-type may be provided around the periphery of the extruder to provide additional heating capacity.

In the instant description, the extrudate 13, is described as being a copolymer of fluorinated ethylene and fluorinated propylene (FEP) and the heaters 14,14 soften the FEP by heating it to a temperature of about 650° F. The heated extrudate 13 is drawn into the form of a hollow cone having a substantially smooth outer peripheral surface as it leaves the discharge end of the extruder. In the present instance, the outer surface of the hot, conically shaped extrudate is subjected to atmospheric ambient conditions; however, if desired, a funnel-shaped member may be provided adjacent the extruder to provide additional support and guidance for the extrudate.

The exact amount of draw-down which may be imparted to the extrudate depends upon a number of variables such as: the properties of the material being extruded, the temperature at which the extrusion takes place, the distance between the extruder and the die, and many other factors which would be apparent to one skilled in the art. The draw-down may be expressed in terms of a ratio between the diameter of the extrudate as it leaves the extruder and its diameter within the die. In the present invention, a draw-down ratio of at least 5 to 1 is permissible; however, optimum results occur with a draw-down ratio of between 3 to 1 and 2 to 1. In addition, a cone angle of from 60° to 90° is particularly desirable, the cone angle being the apex angle of the conical extrudate.

After the extrudate 13 is produced in a softened condition, it must be hardened to set the wall into a desired configuration and to impart strength to the resultant tubing. For this purpose, the cooling chamber 11 is provided adjacent the discharge end 10a of the extruder 10. The cooling chamber 11 has a front wall 15 and a rear wall 16 and is adapted to be filled with a cooling fluid to the level indicated at A; in the present instance the cooling fluid is water. The cooling chamber 11 is hermetically sealed by a door or lid 17 which is secured to the front and rear walls 15 and 16, respectively, by threaded connections shown generally at 18 and 19, respectively.

The flow of cooling water to the cooling chamber 11 is controlled by means of a valve 20, the valve 20 being adjusted to provide a flow rate sufficient to maintain a temperature in the chamber which is adequate to properly set the extrudate, which in the present invention is about 60° F. The water level in the chamber 11 is controlled by an overflow 21 which telescopes into an upright overflow pipe 22, and a conventional clamp 23 is provided on the pipe 22 to lock the overflow 21 in any preselected position. A pump 44 is provided below the cooling chamber and is connected to the overflow pipe 22 to draw the cooling water from the cooling chamber, and as more fully explained hereinafter, the pump 44 also reduces the pressure in the cooling chamber 11. In addition, a drain valve 24 is provided in the bottom of the chamber 11 to permit the cooling fluid to be drained from the chamber when the die is being changed. Furthermore, it may be desirable in some instances to operate with a fluid level which is below the extruded tubing in the cooling chamber, in which case the cooling fluid may be sprayed onto the surface of the tubing by a suitable spraying apparatus.

Figure 2:
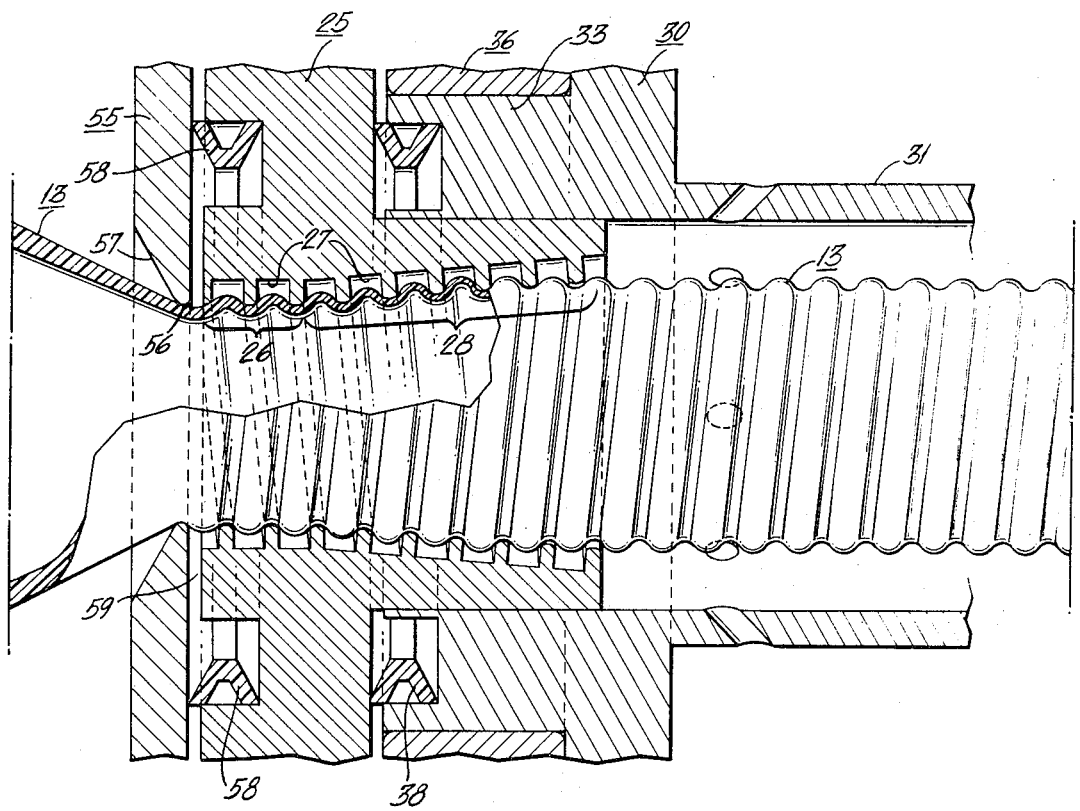
FIG. 2 is an enlarged fragmentary view in longitudinal section of the anti-rotation plate and die arrangement illustrated in FIG. 1.

For the purpose of shaping the extrudate preparatory to entering the cooling chamber, a die 25 is provided intermediate the extruder and the cooling chamber. The die 25 (FIGS. 1 and 2) has an axial bore 26 in which is formed a helical groove 27, the die 25 being coaxially aligned with the extruder 10 below the water level A, so that the cooling water flows into the die to cool the hot extrudate and to set the wall thereof. As may be readily seen in FIG. 2, the die has a grooved portion 28 remote from the extruder 10 which spirals radially outward from the axis of rotation of the die and which extends axially in the direction of the cooling chamber 11. This radially spiraling portion of the die reduces the friction between the extrudate and the die and promotes the positive disengagement of the extrudate from the groove to thereby obviate any tendency which may be present for the corrugations to jam within the groove.

In order to facilitate the rapid removal and replacement of the die, the die is mounted on the front wall 15 of the cooling chamber 11 on a plate 30 which has a hub 33 projecting forwardly and a sleeve 31 projecting rearwardly into the cooling chamber 11 through an aperture 32 in the front cooling chamber. A drive wheel 35 is mounted on the hub 33 by a bearing assembly 36, and the drive wheel 35 has a centrally recessed portion 37 facing the extruder 10 which is internally threaded to receive mating threads on the periphery of the die 25. A seal 38 is also mounted in the front face of the hub 33 to engage the die 25 and to prevent air from leaking into the cooling chamber. Therefore, when the die is threaded onto the drive wheel, the rearward portion 28 thereof rotates in the sleeve 31, so that with this mounting arrangement, the die 25 may be rapidly removed from the drive wheel 35 with a minimum amount of tools and skill. Moreover, the die 25 may then be replaced with another die having a different bore and groove characteristics to thereby provide a helical tube-forming apparatus which may be quickly changed to accommodate various size tubing.

For the purpose of positively forcing the extrudate into the helical groove in the die, means is provided for applying a pressure differential across the wall of the hot extrudate when the extrudate is within the die. To this end, a vent 43 is provided in the extruder 10 between the discharge end 10a and the exterior of the extruder to thereby provide fluid communication between the interior of the hollow conical extrudate 13 and a body of fluid at a reference pressure, which in the present instance is air at atmospheric pressure. A pressure differential is produced across the tubing well in the die 25 by a vacuum pump 44 which is connected to the cooling chamber 11 through the upstanding overflow pipe 22. The groove 27 in the die 25 provides fluid communication between the peripheral surface of the extrudate in the die and the interior of the cooling chamber 11, so that when the pressure is reduced in the cooling chamber 11, the pressure is similarly reduced in the groove 27 in the die. Therefore, with atmospheric pressure in the interior of the extrudate 13 and with a predetermined vacuum or negative pressure in the groove 27, the extrudate 13 is forced into the groove and adopts substantially the configuration shown in FIG. 2. In order to regulate the vacuum in the cooling chamber 11, a valved vent 41 is provided above the water level in the chamber so that by properly adjusting the valve, atmospheric air may be bled into the cooling chamber 11. In the present instance an adjusted pressure differential of about 5 pounds per square inch across the wall of the extrudate 13 is sufficient to force the extrudate 13 into the groove; however, other pressures may also produce adequate results depending upon the temperature and properties of the extrudate. If desired, the pressure differential may be adjusted to vary the depth of the corrugations in the tubing, and with an appropriate control of the vacuum pump 44 or the valved inlet 41, the pressure differential may be periodically varied to produce tubing having different corrugations in spaced intervals therealong. Furthermore, the depth of the corrugations may be varied in such a manner to provide intervals in which there are no corrugations present in the tubing merely by properly controlling the vacuum pump and the valved inlet.

In order to support the tubing in the cooling chamber while the corrugations are being set, and for the purpose of providing a sealed opening through which the tubing passes out of the cooling chamber, a flexible closure member 39 is mounted on the rear wall 16 of the chamber 11. The closure member has a cylindrical opening 39a axially aligned with the die to thereby support the tubing substantially horizontally within the cooling chamber. In addition, a ring 40 and bolts 42 are provided to sealingly secure the closure member 39 to the cooling chamber 11.

As noted heretofore, the die is threadedly secured to a drive wheel which is rotatably mounted on a hub on the cooling chamber. In order to impart helical corrugations to the extrudate, the die is rotated relative to the extrudate, and, for this purpose, means is provided for rotating the die. The rotating means comprises a conventional belt and pulley drive shown generally at 45, the belt being of the V-type and engaging a V-shaped groove in the periphery of the drive wheel 35. A pulley 46 engages the belt 47, and the pulley 46 is connected to a variable-speed drive motor shown schematically at 48. Therefore, when the drive motor 48 is energized, the belt and pulley drive arrangement rotates the drive wheel 35 and the die 25 around the extrudate 13 as it is advanced to corrugate the extrudate. In addition, tubing may be produced having intervals in which no corrugations are present merely by periodically arresting the rotation of the die.

For this purpose of smoothly forming the helical corrugation in the extrudate, means is provided for drawing the extrudate through the die at a velocity which is synchronized with the rotation of the die. To this end, a pair of take-up belts 50 and 51 are provided to apply the necessary tension to the extrudate 13 to draw it through the die. The take-up belts 50 and 51 are driven at a predetermined speed which is synchronized with the rotation of the die 25, so that the angular velocity of the die may be adjusted to correspond with the pitch of the helical groove in the die to form tubing having a desired pitch or number of helices per unit of length. In addition, the take-up belts 50 and 51 are aligned with the die 25 and are spaced apart a predetermined distance to engage the wall of the extrudate 13 and to compress it into a substantially, oval shape. In this manner, the take-up belts not only provide the tension required to draw the extrudate through the die, but they also cooperate to limit the tendency of the extrudate to rotate with the die while the convolutions are being formed therein.

As noted above, the rotation of the die tends to impart an axial twist to the extrudate between the extruder and the die when the helical corrugations are being formed. If the twist is excessive, the wall of the extrudate kinks and permits air to enter the die, whereupon the vacuum in the die is lost or at least reduced to the point where corrugations are no longer formed in the tubing. Moreover, the tendency to rotate with the die is also undesirable because it adversely affects the formation of the helical corrugations. Although the take-up belts cooperate with the closure member in the rear wall to reduce these tendencies; nevertheless, they must not squeeze so tightly as to permanently deform the tube. Therefore, in accordance with the present invention, additional means is provided to limit the rotation of the extrudate with the die.

The rotation-limiting means comprises a stationary anti-rotation and sealing plate 55 mounted intermediate the cooling chamber 11 and the extruder 10, the anti-rotation and sealing plate 55 being bolted to the plate 30 so that the die 25 and plate 55 may thereby be rapidly removed and replaced. The plate 55 has a circular aperture 56 coaxially aligned with the bore in the die, and a bevelled surface 57 around the aperture 56 confronts the extruder 10 to guide the extrudate 13 into the die. A seal 58 is provided between the die 25 and the anti-rotation plate 57 to thereby define a cavity or recess 59 around the extrudate 13 between the aperture 56 and the entrance to the die 25. Passage means, including the helical groove 27 in the die 25, provides fluid communication between the cavity 59 and the interior of the cooling chamber 11, so that when a vacuum is applied within the cooling chamber, the vacuum is also applied within the groove 27 and the cavity 59. With the interior of the extrudate 13 at atmospheric pressure, and the exterior thereof at the subatmospheric pressure in the cavity 59, the extrudate 13 is urged into frictional engagement with the aperture 56. The anti-rotation plate thereby prevents the extrudate from twisting excessively and kinking so that the vacuum in the die is preserved. Moreover, the intimate contact between the extrudate and the aperture provides an effective seal against the entry of air into the die. Thus, with this arrangement, the anti-rotation plate 55 cooperates with the take-up belts 50 and 51 and the closure member 39 to greatly reduce the rotational tendency of the extrudate while simultaneously preserving the vacuum in the cooling chamber.

Figure 3:
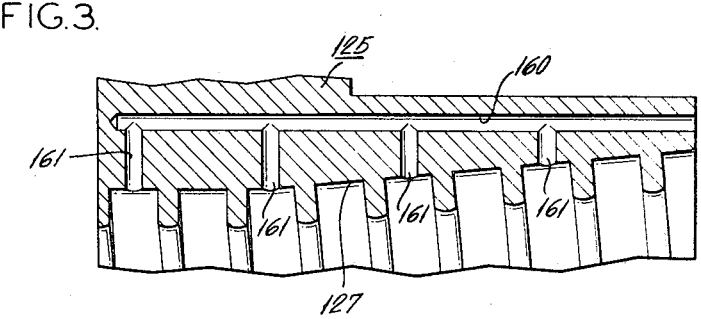
FIG. 3 is an enlarged fragmentary view in longitudinal section of a die having a modified passage arrangement.

For the purpose of further improving the pressure distribution in the die and the cavity, a modified die 125 (FIG. 3) may be provided having a manifold 160 with a plurality of laterals 161 which open into a groove 127. In this manner, parallel passages are provided in the die 125 to thereby more evenly distribute the pressure within the groove and the cavity and to improve the circulation of cooling fluid in the die.

In operation, the extruder 10 is started and the extrudate 13 is fed into the die 25 after passing through the aperture in the anti-rotation plate 55. The vacuum pump 44 is also energized to apply a vacuum in the groove in the die, and the vent valve 41 is adjusted to regulate the vacuum in the cooling chamber. A controlled flow of cooling water is supplied to the cooling chamber 11, the flow rate being adjusted by the valve 20 to maintain the proper cooling temperature in the chamber. When the motor 48 is energized, the belt and pulley drive arrangement rotates the die 25 on its axis and around the extrudate 13, and the take-up belts 50 and 51 are displaced at a predetermined linear velocity to draw the extrudate through the die. The vacuum in the cooling chamber 11 is applied to the helical groove 27 in the die 25 to produce a pressure differential across the wall of the extrudate and to force the extrudate into the groove. At the same time, the cooling chamber vacuum is also applied in the cavity 59 surrounding the extrudate 13 at the entrance to the die, so that the extrudate frictionally engages the aperture 56 in the anti-rotation plate to thereby sealingly grip the extrudate and reduce its tendency to rotate with the die. The take-up belts 50 and 51 also grip the formed tube and cooperate with the anti-rotation plate 55 to further reduce the rotational tendency of the extrudate. In this manner, a continuous length of seamless, helically corrugated plastic tubing is produced in an uninterrupted process. Furthermore, the apparatus of the present invention is particularly suited for being quickly changed to produce tubing having various sizes and shapes of helical corrugations with a minimum amount of tools and with a minimum interruption in production.

Although the described method and apparatus is particularly suited for producing helically corrugated tubing from copolymers of fluorinated ethylene and fluorinated propylene, by extrusion; nevertheless, the instant invention may also be employed to produce helically corrugated tubing from any melt-extrudable thermoplastic material, for example, polyethylene, polypropylene, vinyl polymers and copolymers, chlorotrifluoroethylene polymers, nylon and the like.

As previously stated the method and apparatus of the present invention are equally suited for producing helically corrugated tubing from materials such as tetrafluoroethylene (TFE) which are not melt-extrudable. This is effected by heating a length of pre-formed tubing into a softened condition and feeding the softened TFE tubing into a rotating die in such the same manner as the melt-extrudable material. The principal difference between the processing of melt-extrudable and non-melt extrudable material is that the extruder is replaced with means for heating pre-formed tubing into a pliable condition before it enters the rotating die.

In the case of TFE tubing, a preformed TFE tube of selected uniform diameter and wall thickness is produced by the conventional paste extrusion process in which the TFE material is first extruded and then sintered. To produce corrugated TFE tubing according to the present invention, a continuous length of the preformed TFE tubing is advanced axially through a heater in which the tubing is heated to a temperature above the gel point to soften the tube material sufficiently to enable the helical corrugations to be formed therein by a rotating die. Before entering the rotating die, and to prevent the softened tube from being twisted and kinked by the rotating die, the softened tube passes through anti-rotation means which frictionally engages the tube circumferentially thereof to restrain the tube from rotating with the die as the helical corrugations are formed therein. The corrugated tube is then cooled in a cooling chamber to permanently set the corrugations therein.

Figure 4:
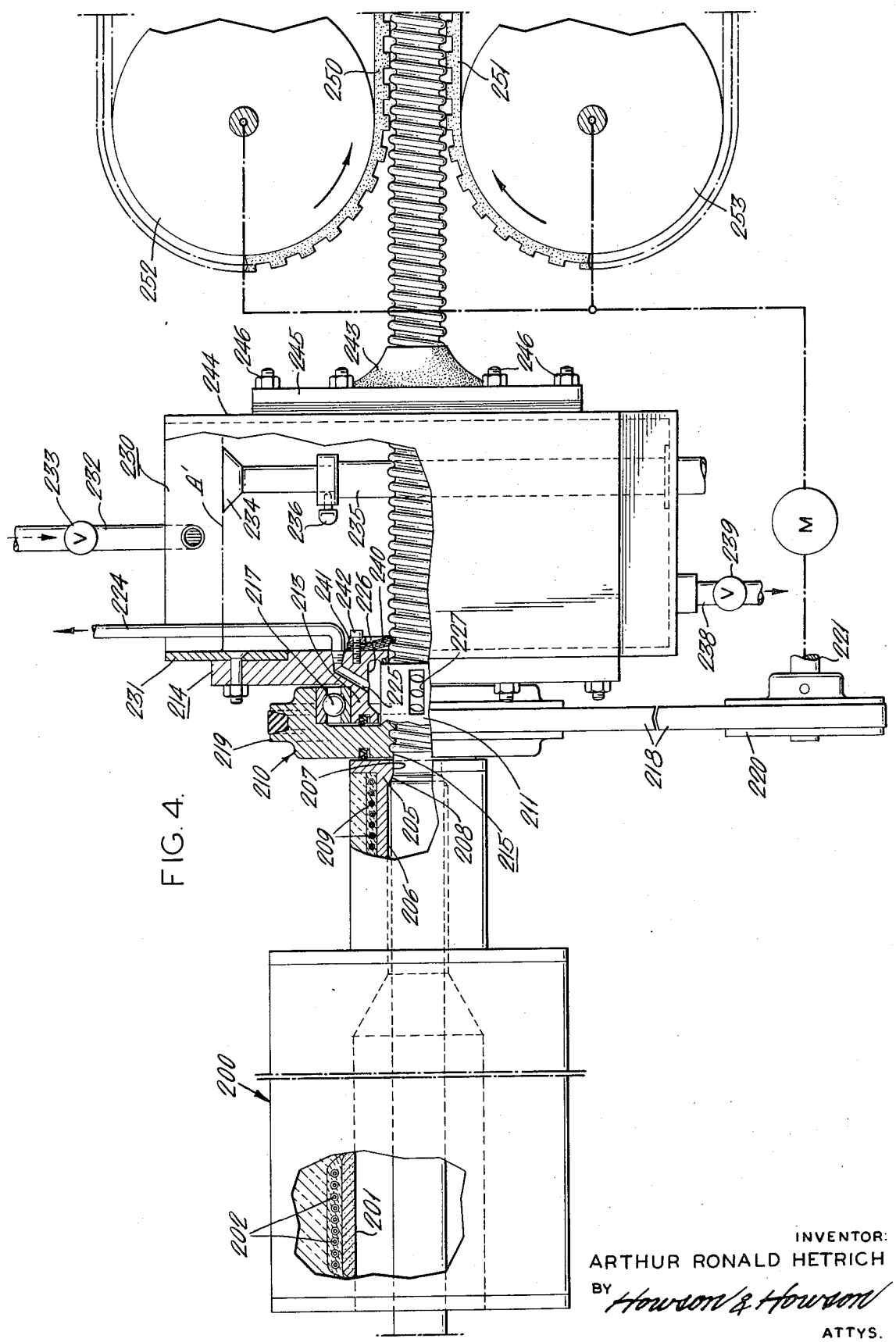
FIG. 4 is a side elevational view of another embodiment of apparatus for producing corrugated tubing from pre-formed tubing which is not melt-extrudable.

Referring to the drawings, FIG. 4 illustrates an embodiment of apparatus for producing helical corrugated TFE tubing which comprises generally a primary heater 200, anti-rotation means 205, a rotating die 210 and a cooling chamber 230. The heater 200 has a cylindrical chamber 201 extending therethrough, and the diameter of the chamber 201 is substantially greater than the outside diameter of the pre-formed TFE tubing being processed in order to provide space between the tubing and the surrounding wall of the chamber to eliminate or minimize linear drag or tension on the tubing as it moves through the heater. During passage of the tubing through the heater 200 the tubing is heated to a temperature above the gel point (about 621° F.) of the TFE material, for example, to about 650° F. in order to soften the TFE material sufficiently to enable the helical corrugations to be formed therein. In the present instance this is accomplished by radiant heat supplied, for example, by electric heating coils 202 provided with suitable controls (not shown) to insure heating of the TFE tubing to the desired temperature.

As previously described, the rotation of the die tends to impart an axial twist to the softened TFE tubing with the result that the softened tubing becomes kinked and distorted unless the softened tubing is restrained against rotation with the die. Accordingly, upon leaving the heater 200 and before entering the rotating corrugating die 210, the heated softened TFE tubing passes through an anti-rotation device 205 having means for frictionally engaging the softened tube circumferentially thereof with sufficient braking or restraining force to prevent the tube from rotating with the corrugating die so that the softened tubing will not be twisted or kinked before entering the die.

As shown in the drawings, the anti-rotation device 205 is of elongated configuration having a cylindrical chamber 206 extending therethrough in coaxial alignment with the chamber 201 of the heater 200. For most of its length the chamber 206 has a diameter slightly larger than the outside diameter of the softened TFE tubing in order to minimize linear drag on the tubing as it passes through the chamber 201. However, adjacent the outlet end of the device 205 the diameter of the chamber 206 is reduced for a short distance inwardly from the end as shown to provide a restriction or throat 207 having a diameter slightly less than the outside diameter of the heated softened TFE tubing. The transition from the larger diameter portion of the chamber 206 to the restriction or throat 207 is gradual as indicated by the slope or ramp 208 which is disposed, for example, at an angle about 30° with respect to the axis of the chamber 206. The anti-rotation device 205 is provided with heating means such as electric coils 209 surrounding the chamber 206 which serve to maintain the tubing at the desired temperature above the gel point during passage of the tubing therethrough.

The softened TFE tubing is pulled through the heater 200 and anti-rotation device 205 by the rotating die 210 as the latter forms the helical convolutions in the softened tubing. As the softened tubing moves through the restriction or throat 207 it is drawn and reduced slightly in diameter so that the restriction or throat 207 engages the surface of the tubing circumferentially thereof with sufficient friction force to restrain the tube against rotating with the die and thereby prevent kinking and twisting of the tube that might otherwise result.

The rotating die 210 has axially projecting hub portion 211 rotatably received within a bore 212 extending coaxially through the central hub portion 213 of a mounting plate 214 which is fixedly secured to the adjacent wall 231 of the cooling chamber 230. The die 210 and its hub portion 211 have an axial bore 215 extending therethrough and the wall of the bore 215 is formed with a helical groove 216 which, as the die 210 is rotated, operates to form a continuous helical corrugation in the wall of the softened TFE tubing as the latter passes through the die. The die 210 is rotatably mounted on the hub 213 of the plate 214 by a bearing 217 and is rotationally driven at the desired speed by a belt 218 which passes about a pulley 219 provided peripherally of the die 210. The belt 218 in turn is driven by a second pulley 220 mounted on a shaft 221 and driven by a motor M. Suitable seals 222 and 223 are provided, respectively, between the anti-rotation device 205 and the rotating die 210 and between the latter and the mounting plate 214.

As in the case of the first embodiment of the invention, means is provided for forcing the softened TFE tubing into the convolutions of the helical groove 216 in the bore 215 of the die 210. To this end the interior of the softened TFE tubing is open to the atmosphere and a pressure differential is produced across the tubing wall in the die 210 by means of a vacuum pump (not shown). The vacuum pump is connected by a pipe 224 to a passage 225 in the mounting plate 214 which in turn connects to an annular manifold 226 in said plate 214 which circumscribes the bore 215 of the die 210. Communication between the manifold 226 and the helical groove 216 is provided by a plurality of axial slots or grooves 227 equally spaced circumferentially of the bore of the die and intersecting the radial apices of the helical groove 216 as more clearly shown in FIG. 6. Therefore, with the interior of the softened TFE tubing at atmospheric pressure and a predetermined vacuum or negative pressure in the helical groove 216 the softened TFE tubing is forced into the groove 216 and is formed to the configuration shown in FIG. 5.

From the rotating die 210 the helically corrugated TFE tubing passes through the cooling chamber 230 wherein the tubing is cooled to permanently set the corrugated configuration formed by the rotating die 210 into the wall of the tubing. For this purpose the cooling chamber 230 is substantially filled with a cooling liquid, such as water, to the level indicated at A'. The cooling water is supplied to the chamber 230 by a pipe 232 controlled by means of a valve 233 which is adjusted to provide a flow rate sufficient to maintain the cooling temperature in the chamber 230 required to properly set the corrugated tubing, for example, about 60°F. The water level in the chamber 230 is controlled by an overflow 234 which telescopes into an upright overflow pipe 235 provided with a clamp 236 to lock the overflow 234 in any preselected vertical position. In addition, a drain 238 having a valve 239 is provided at the bottom of the chamber 230 to permit the cooling liquid to be drained from the chamber.

To provide a seal at the opening through which the corrugated TFE tubing enters the cooling chamber 230 and also to assist in supporting the TFE tubing in the chamber 230 while being set, an annular flexible closure member 240 is mounted on the adjacent inner wall of the mounting plate 214 by means of a ring 241 and bolts 242. The diameter of the opening through the seal 240 is such that the inner peripheral edge portion of the seal 240 engages within the helical configurations formed in the TFE tubing as best shown in FIG. 5. In addition, and for the same purpose, a similar flexible annular closure member 243 is provided at the outlet opening in the opposite wall 244 of the cooling chamber 230 through which the corrugated TFE tubing exits from the cooling chamber. As in the case of the seal 240, the seal 243 may be secured in place by a ring 245 and bolts 246.

The corrugated TFE tubing is drawn through the die 210 and cooling chamber 230 at a velocity synchronized with rotation of said die by a pair of opposed take-up belts 250 and 251 mounted respectively on rolls 252 and 253. The rolls 252 and 253 are driven by the motor M at a predetermined speed to correspond with the pitch of the helical groove 216 in the die 210 to form TFE tubing having the desired pitch or number of corrugations per unit of length. The belts 250 and 251 are spaced apart a predetermined distance to engage the surface of the TFE tubing with sufficient pressure not only to provide the tension or pull required to draw the TFE tubing through the die 210 but also to cooperate with the restriction or throat 207 in preventing rotation of the tubing with the die 210 as previously described. However, the belts 250 and 251 must not squeeze the tubing so tightly as to permanently deform the tubing. As in the case of the first embodiment, the TFE tubing preferably is drawn through the die 210 at a linear rate corresponding to the aforesaid formula $V=W/N$ within the ranges of speed of rotation and pitch previously described.

In practicing this embodiment of the invention, the preformed TFE tubing is passed through the heater 200 where it is heated above the gel point of the TFE material to about 650° F. The softened TFE tubing then passes through the anti-rotation device 205 and into the rotating die 210. Vacuum is applied to the groove 216 in the die 210 and is adjusted to provide the desired pressure differential across the wall of the tubing. A controlled flow of cooling water is supplied to the cooling chamber 230, the flow rate being adjusted by the valve 233 to maintain the proper cooling temperature in the chamber. When the motor M is energized, the belt and pulley drive arrangement rotates the die 210 on its axis and around the heated softened TFE tubing, and the take-up belts 250 and 251 are driven at a predetermined linear velocity to draw the softened tubing through the die. Just prior to entering the rotating die 210 the TFE tubing is drawn through the restriction or throat 207 and is frictionally engaged thereby circumferentially with sufficient force to restrain the tubing from rotating with the die 210. The take-up belts 250 and 251 also cooperate with the throat 207 to further reduce any rotational tendency of the tubing. In this manner, a continuous length of seamless, helically corrugated TFE tubing is produced in an uninterrupted process. Furthermore, the apparatus of the present embodiment is particularly suited for quickly changing the die 210 to produce tubing having various sizes and shapes of helical corrugations.

Apart from the material previously described, other materials, for example, materials which are strengthened by vulcanization may also be processed by the method and apparatus of the present invention. For instance, such materials may be formed in their thermoplastic state and set by vulcanization with suitable heating equipment rather than being set with the cooling chamber employed in the apparatus of the present invention.

While certain preferred embodiments of the present invention have been illustrated and described, it is intended that changes and modifications may be made without departing from the invention as defined in the appended claims.

I claim:

1. The method of making helically corrugated tetrafluoroethylene tubing which comprises axially advancing a continuous length of preformed cylindrical tetrafluoroethylene tubing, heating said advancing preformed tubing to a temperature above the gel point of said tubing to soften the tube material, drawing the heated softened tubing to reduce the diameter thereof and simultaneously frictionally engaging the softened tubing circumferentially thereof with a predetermined restraining force to prevent rotation of said softened tubing, introducing the drawn and circumferentially restrained softened tubing while still heated axially into a rotating die having a bore provided with a helical groove, the predetermined circumferential restraining force exerted on the softened tubing being sufficient to hold said tubing against rotation with the die and thereby prevent the softened tubing from being twisted and kinked by said die before entering the die, applying a differential pressure across the wall of said softened tubing in said die while rotating said die relative to said tubing to urge the softened tubing wall into said helical groove to form a helical corrugation in said tubing wall, cooling the corrugated tubing to permanently set said helical corrugation in said tubing wall, and engaging and drawing the cooled corrugated tubing axially away from the die at a predetermined linear speed to cause the softened tubing to traverse the die at a velocity synchronized with the speed of rotation of the die.

2. Apparatus for making corrugated tetrafluoroethylene tubing comprising means for axially advancing a continuous length of preformed cylindrical tetrafluoroethylene tubing, means for heating the advancing preformed tubing to a temperature above the gel point thereof to soften the tube material, means for drawing the softened tubing to a smaller diameter and simultaneously frictionally engaging the softened tubing circumferentially thereof with a predetermined restraining force to prevent rotation of said softened tubing, a die rotatable about its axis and having an axial bore provided with a helical groove for receiving the heated softened tubing, means for rotating the die at a predetermined speed, the predetermined circumferential restraining force exerted on the softened tubing by said drawing means being sufficient to restrain the tubing from rotating with the die and prevent the rotating die from twisting and kinking the softened tubing before entering the die, means operable to produce a pressure differential across the wall of said tubing in said rotating die to urge said wall into the helical groove to form a helical corrugation in the tubing wall, means synchronized with said die rotating means for drawing said tubular body axially through said rotating die to form a helical corrugation in said tubing wall, cooling means containing a cooling medium operable to cool said tubular body and set said helical corrugation in said tubing wall, and means engaging and drawing the cooled corrugated tubing axially away from the die at a predetermined linear speed to cause the softened tubing to traverse the die at a velocity synchronized with the speed of rotation of the die.

* * * * *

UNITED STATES PATENT OFFICE
CERTIFICATE OF CORRECTION

Patent No. 3,692,889    Dated September 19, 1972

Inventor(s) Arthur R. Hetrich

It is certified that error appears in the above-identified patent and that said Letters Patent are hereby corrected as shown below:

In the Abstract, line 3, "disc" should read -- die --;

Col. 4, line 59, after "chamber" insert -- wall --;

Col. 8, line 16, "such" should read -- much --.

Signed and sealed this 8th day of May 1973.

(SEAL)
Attest:

EDWARD M. FLETCHER, JR.      ROBERT GOTTSCHALK
Attesting Officer     Commissioner of Patents